(12) United States Patent
Ishikawa et al.

(10) Patent No.: US 6,549,124 B1
(45) Date of Patent: Apr. 15, 2003

(54) ENVIRONMENT MONITORING SYSTEM FOR A VEHICLE WITH AN IMAGE PICKUP DEVICE

(75) Inventors: Naoto Ishikawa, Shizuoka (JP); Kazutomo Fujinami, Shizuoka (JP); Keiki Okamoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/514,354

(22) Filed: Feb. 28, 2000

(30) Foreign Application Priority Data

Mar. 1, 1999 (JP) .......................................... 11-052434

(51) Int. Cl.[7] .............................................. B60Q 1/00
(52) U.S. Cl. ................. 340/435; 340/436; 340/425.5; 340/540; 340/901
(58) Field of Search ............................ 340/903, 901, 340/904, 937, 435, 436, 425.5, 679, 540

(56) References Cited

U.S. PATENT DOCUMENTS

| | | | | |
|---|---|---|---|---|
| 5,475,494 A | * | 12/1995 | Nishida et al. | 180/169 |
| 6,101,332 A | * | 8/2000 | Satoh | 396/52 |
| 6,226,389 B1 | * | 5/2001 | Lemelson et al. | 382/104 |
| 6,246,961 B1 | * | 6/2001 | Sasaki et al. | 701/301 |

FOREIGN PATENT DOCUMENTS

| | | | | |
|---|---|---|---|---|
| JP | 7-50769 | | 2/1995 | |
| JP | 08285534 A | * | 11/1996 | ............ B60Q/11/00 |

* cited by examiner

Primary Examiner—Daniel J. Wu
Assistant Examiner—Sihong Huang
(74) Attorney, Agent, or Firm—Armstrong, Westerman & Hattori, LLP (57) ABSTRACT

In an environment monitoring system for a vehicle, when a detecting means decides that an approaching vehicle cannot be detected by an image processing means, a waning means gives warning of this fact. Thus, the environment monitoring system permits one's own vehicle to run with safety even when the approaching vehicle cannot be detected.

10 Claims, 9 Drawing Sheets

ENVIRONMENT MONITORING SYSTEM FOR A VEHICLE WITH AN IMAGE PICKUP DEVICE

BACKGROUND OF THE INVENTION

1. Field of the Invention

The present invention relates to an environment monitoring system, and more particularly to an environment monitoring system for picking up the environment (road image) of one's own vehicle by an image pick-up means such as a camera installed on the vehicle such as a motor car, detecting a vehicle approaching from the environment of one's own running vehicle using the road image picked up and giving a warning to a driver.

2. Description of the Related Art

For example, when a driver of a vehicle running on one-side two lanes of e.g. a speed way intends to change his own vehicle lane, if he changes the lane while he misses a vehicle which catches up with his own vehicle on another lane at a higher speed than his own vehicle from the diagonal-rear direction, there is strong possibility of a serious accident. Therefore, it is desired that the driver surely notices or recognizes other vehicles in the environment.

When the following vehicle on the same lane abruptly approaches his own vehicle from the rear, if the driver of his own vehicle makes abrupt braking, there is possibility of bumping-into-the back.

When another vehicle runs forward on the same lane at a lower speed than that of his own vehicle, if a driver dozes, there is a danger of bumping-into-the back.

A technique for avoiding the danger as described above has been proposed as an environment monitoring system for a vehicle disclosed in JP-A-7-50769. Now referring to FIGS. 10A–10D, an explanation will be given of this environment monitoring system.

Figure 10A:
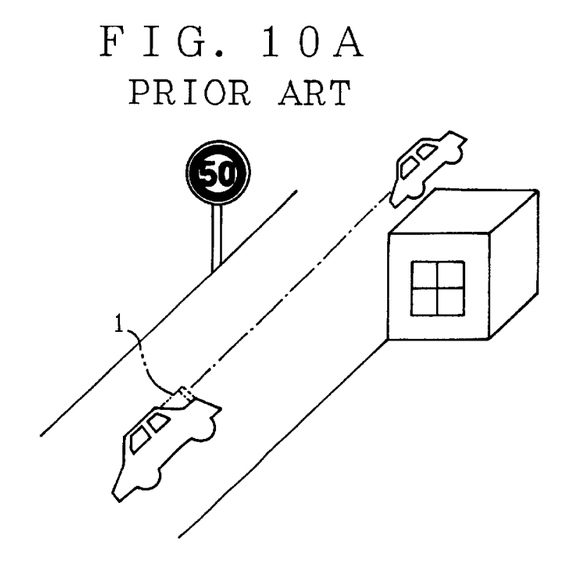
FIGS. 10A–10D are views for explaining the operation of detecting optical flows.
Figure 10B:
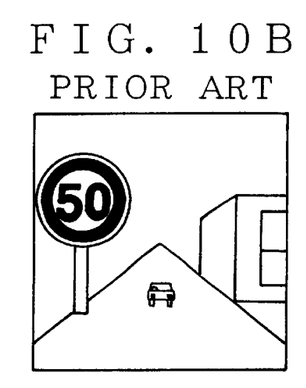
Figure 10C:
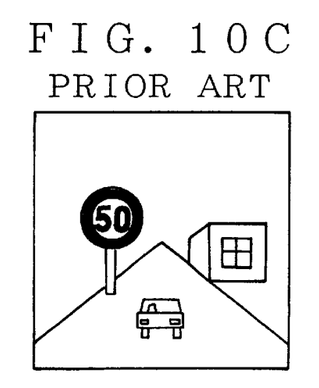

FIGS. 10A–10C are views for explaining a change in a rear background image acquired by a video camera 1. FIG. 10A shows a status inclusive of one's own vehicle. FIG. 10B shows an image picked up by a video camera 1 at timing t in an environment of one's own vehicle. FIG. 10C shows an image picked up at timing t+Δt.

Figure 10D:
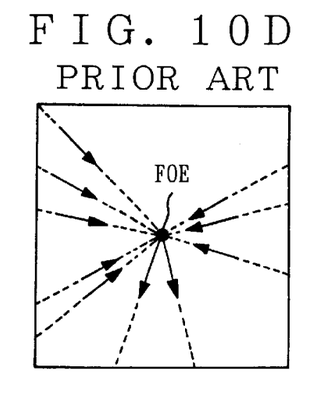

Now it is assumed that one's own vehicle is running straight on a flat road. The road sign and building residing in the rear of one's own vehicle in FIG. 10A are observed as images shown in FIGS. 10B and 10C at timings t and t+Δt, respectively. Coupling the corresponding points in these two images provides speed vectors as shown in FIG. 10D. The are referred to as "optical flows". Where a following vehicle approaches, the directions of the vectors in the optical flows in FIG. 10D are contrary. Using the optical flows, the conventional environment monitoring system monitors the relationship between one's own vehicle and the following vehicle or another vehicle running on an adjacent lane to detect the other vehicle approaching one's own vehicle, thereby giving a warning to a driver.

In some prior arts, a technique of searching corresponding points using two cameras is adopted. Specifically, an edge point Pa of an object is detected from a luminance difference between the adjacent pixels on the image picked up by a camera. A point Pb of the image picked up by another camera corresponding to the detected edge point is detected. The position of an approaching vehicle is acquired by the pixel coordinates of Pa and Pb. On the basis of the position of the approaching vehicle acquired, the pertinent driver is given a warning of the existence of the vehicle approaching his own vehicle.

However, where it is difficult to recognize the status of the environment using the image picked up by a camera owing to fog or strong rain, the above conventional environment monitoring system cannot detect the approaching vehicle through image processing.

Figure 11A:
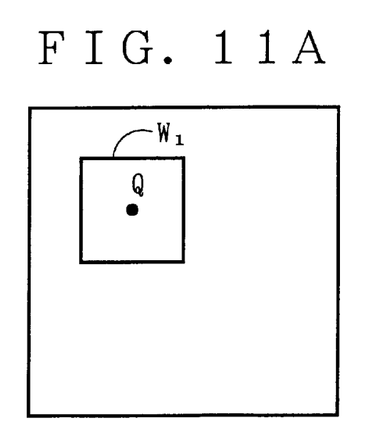
FIGS. 11A and 11B are views for explaining the correlative technique.
Figure 11B:
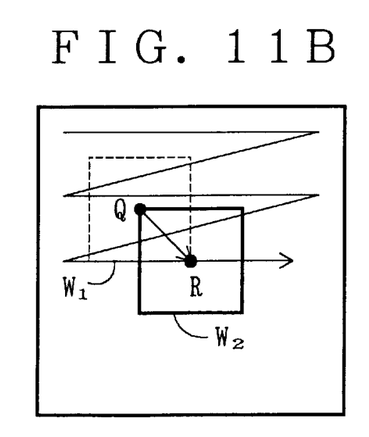

In the environment monitoring system using optical flows, in order to acquire the optical flows, for example, a "correlative technique" of detecting the corresponding points between two frames of images' has been adopted. Referring to FIGS. 11A and 11B, an explanation will be given of the correlative technique. First, on an image picked-up at timing t, a window W1 is set for a pixel Q at issue (FIG. 11A). Next, on the image picked up at timing t+Δt, while the window corresponding to the pixel Q is moved on the entire region of the image picked-up, the absolute value in the luminance difference between the corresponding pixels at timings t and t+Δt is acquired. This operation will be carried out for each of the pixels constituting the image. The point in the window W2 when the sum of the luminance differences for the respective pixels is minimum is defined as a corresponding point, i.e. corresponding pixel R. The vector QR thus created is obtained as an optical flow (FIG. 11B).

The correlative technique has the following disadvantage. The optical flow is detected on the basis of the luminance of each of the pixels constituting the window set within each of two frames of images picked up by a camera 1. Therefore, while a vehicle runs in bad weather such as fog or strong rain, the entire image picked-up will be whitish and hence the luminance of each of the corresponding pixels is approximately equal on the entire image. This makes it difficult to detect correct optical flows, and hence impossible to detect the approaching vehicle.

Also in the environment monitoring system using two cameras, the corresponding Pa and Pb between the two frames of images picked up by the two cameras are detected by means of the correlative technique. Therefore, while a vehicle runs in bad weather such as fog or strong rain, it is difficult to detect the corresponding points Pa and Pb, thereby making it impossible to detect another approaching vehicle.

When the environmental condition cannot be recognized using the images picked up by the cameras, the environment monitoring system cannot detect the approaching vehicle, and cannot give a warning even if there is the approaching vehicle. In this case, where a driver continues to run his own vehicle without knowing this fact, he may change the lane with the realization that there is no approaching vehicle. This may lead to the collision of his own vehicle with the approaching vehicle in the adjacent lane. In this way, it is very dangerous for a driver to run his own vehicle with no realization that the approaching vehicle cannot be detected.

SUMMARY OF THE INVENTION

An object of the present invention is to provide an environment monitoring system which permits one's own vehicle to run safely even if an approaching vehicle cannot be detected.

Figure 1A:
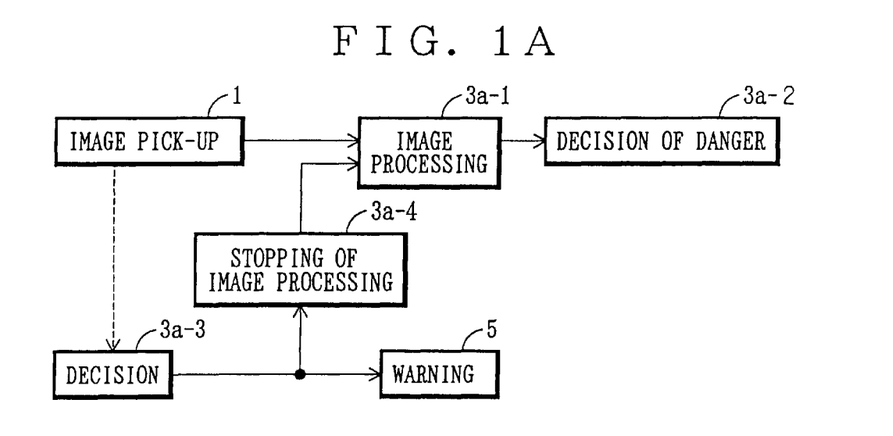
FIGS. 1A–1E are schematic basic diagrams of an environment monitoring system for a vehicle according to the present invention.

In order to attain the above object, as shown in FIG. 1A, an environment monitoring system for a vehicle according to the invention comprises:

image-pickup means 1 loaded on the vehicle for picking up an environment of the vehicle to acquire an image;

image-processing means 3a-1 for processing the image to detect an approaching vehicle;

danger deciding means 3a-2 for deciding danger for the approaching vehicle;

decision means 3a-3 for deciding whether or not the approaching vehicle can be detected by means of the image processing means 3a-1; and warning means 5 for giving warning when it is decided that the approaching vehicle cannot be detected by means of the image processing means.

In this configuration, a driver can notice that the warning means indicates that the approaching vehicle cannot be detected by the image processing means.

Preferably, the decision means decides "NO" if prescribed information is not acquired at any timing from the image picked up by the image pick-up means. Therefore, it is possible to decide directly from the image picked up by the image pick-up means whether or not the approaching vehicle can be detected by the image processing means.

Figure 1B:
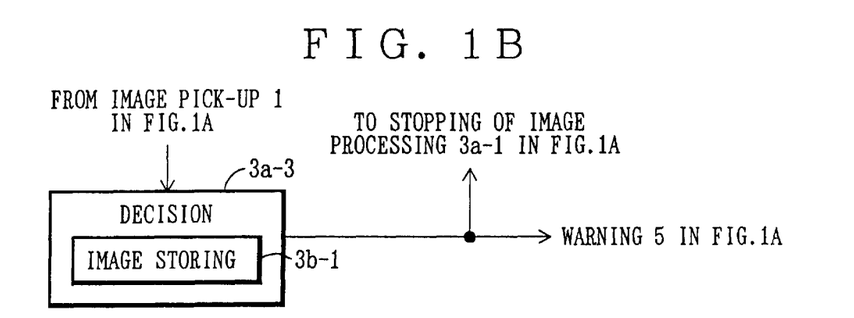

Preferably, as shown in FIG. 1B, the prescribed information is a first image of an object at a prescribed position in the image picked up by the pick-up means when the approaching vehicle can be detected by means of the image processing means; and the deciding means has an image storing means 3b-1 for storing the first image, the deciding means decides "NO" if similarity between the first image stored in the image storing means and a second image of the object at the prescribed position in the image picked up at any timing by the image pick-up means is lower than a prescribed value.

In this configuration, the decision means decides on the basis of similarity between the first image and the second image so that the image processing for only the second image to be performed for the decision can be reduced.

Preferably, the image processing means comprises: a white line detecting means 3a-11 for detecting a white line from the image picked up at any timing by the image pickup means. The prescribed information is a normal detection degree of a white line to be acquired from the image picked up by the pick-up means when the approaching vehicle can be detected by means of the image processing means. The deciding means 3a-3 comprises includes means 3a-31 for computing an optional detection degree of the white line detected by the white line detecting means, and decides "NO" when the optional detecting degree does not satisfy the normal detection degree. In this configuration, even when the environment cannot be partially picked up by the image pick-up means because of stain applied to the image pick-up means, it is not decided that the prescribed information has not been obtained although it can be obtained. Therefore, it can be detected whether or not the prescribed information has been acquired from the image picked up by the image pick-up means.

Figure 1C:
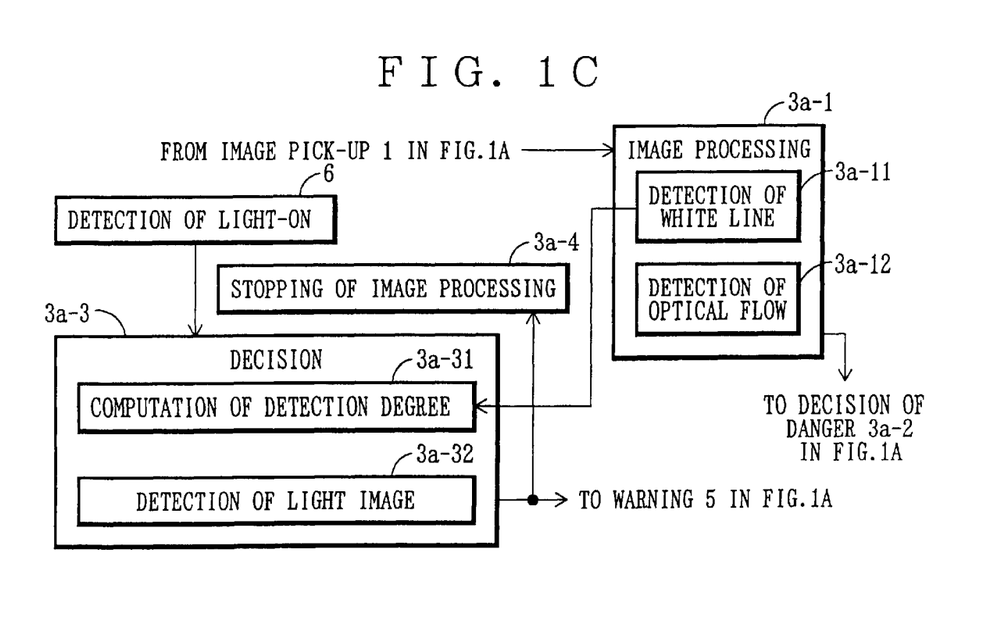

Preferably, the environment monitoring system, as shown in FIG. 1C, further comprises a light-on detecting means 6 for detecting turn-on of a light of a vehicle running in the environment. The prescribed information includes the normal detection degree of the white line and a normal image from the light of another vehicle running in the environment in the image picked up by the pick-up means when the approaching vehicle can be detected by means of the image processing means. The deciding means comprises includes light image detecting means 3a-32 for detecting an optional image from the light of another vehicle running in the environment in the image picked up by the pick-up means at any timing; and when the light-on detecting means detects "ON" of the light, the deciding means decides "NO" if the optional image is an image not obtained when the approaching vehicle can be detected by means of the image processing means, and when the light-on detecting means does not detect "ON" of the light, it decides the normal detection degree of the white line as the prescribed information.

In this configuration, in the nighttime while the headlight is "ON", the normal image obtained by the light is used as the prescribed information, and in the daytime while the headlight is "OFF", the degree of normal detection of the white line is used as the prescribed information. Therefore, in both daytime and nighttime, it can be detected by the decision means 3a-3 whether or not the approaching vehicle can be detected by the image processing means 3a-1.

Figure 1D:
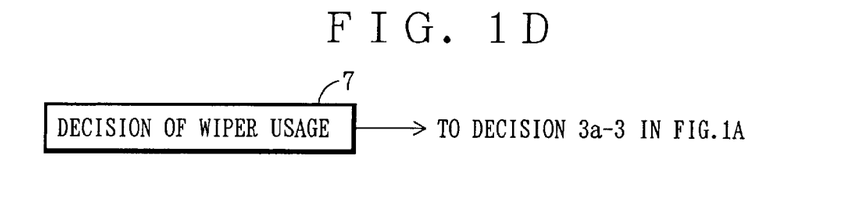
Figure 1E:
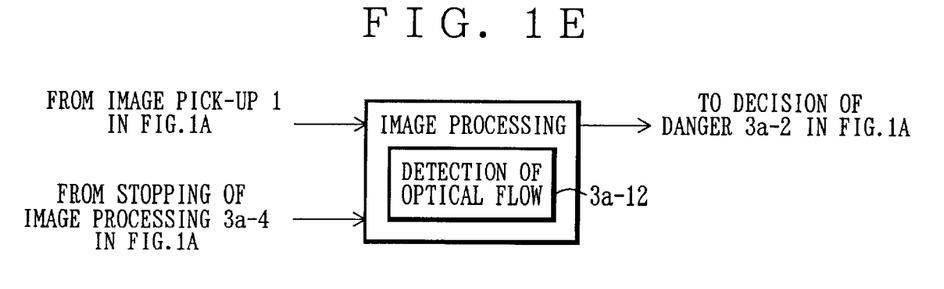

Preferably, as shown in FIG. 1D, using a wiper usage detecting means whether or not a wiper is used, the deciding means decides "NO" when the wiper usage detecting means detects that the wiper is used. In this configuration, it can be decided indirectly without performing image processing whether or not the approaching vehicle can be detected.

Preferably, as shown in FIG. 1D, the image processing means includes an optical flow detecting means for detecting, as an optical flow, movement of the corresponding points in two images obtained at two timings by the image pick-up means; and the danger deciding means decides danger by detecting the vehicle approaching one's own vehicle on the basis of magnitude of the optical flow detected by the optical flow detecting means.

In this configuration, without using two image pick-up means, it is only necessary to decide whether or not the prescribed information can be acquired from the image picked up by a single image pick-up means at any timing.

Preferably, as shown in FIG. 1C, the image processing means comprises:

the white line detecting means for detecting a pair of white lines located on both sides of one's own lane on which one's own vehicle should run;

optical flow detecting means for setting a crossing point of extended lines of the pair of white lines as an FOE (focus of expansion) and detecting, as an optical flow, movement of the corresponding points in two images obtained at two timings by the image pick-up means; and the danger deciding means decides danger by detecting the vehicle approaching one's own vehicle on the basis of magnitude of the optical flow detected by the optical flow detecting means.

In this configuration, the white line detecting means for detecting the white line to detect the optical flow can be used to decide whether or not the approaching vehicle can be detected.

Preferably, as shown in FIG. 1A, the environment monitoring system comprises image processing stopping means for stopping the image processing means from detecting the approaching vehicle when the deciding means decides that the approaching vehicle cannot be detected by the image processing means.

In this configuration, the driver is not misled by the incorrect detection of the approaching vehicle.

The above and other objects and features of the present invention will be more apparent from the following description taken in conjunction with the accompanying drawings.

DESCRIPTION OF THE PREFERRED EMBODIMENTS

Now referring to the drawings, an explanation will be given of various embodiments of the present invention.

Embodiment 1

Figure 2:
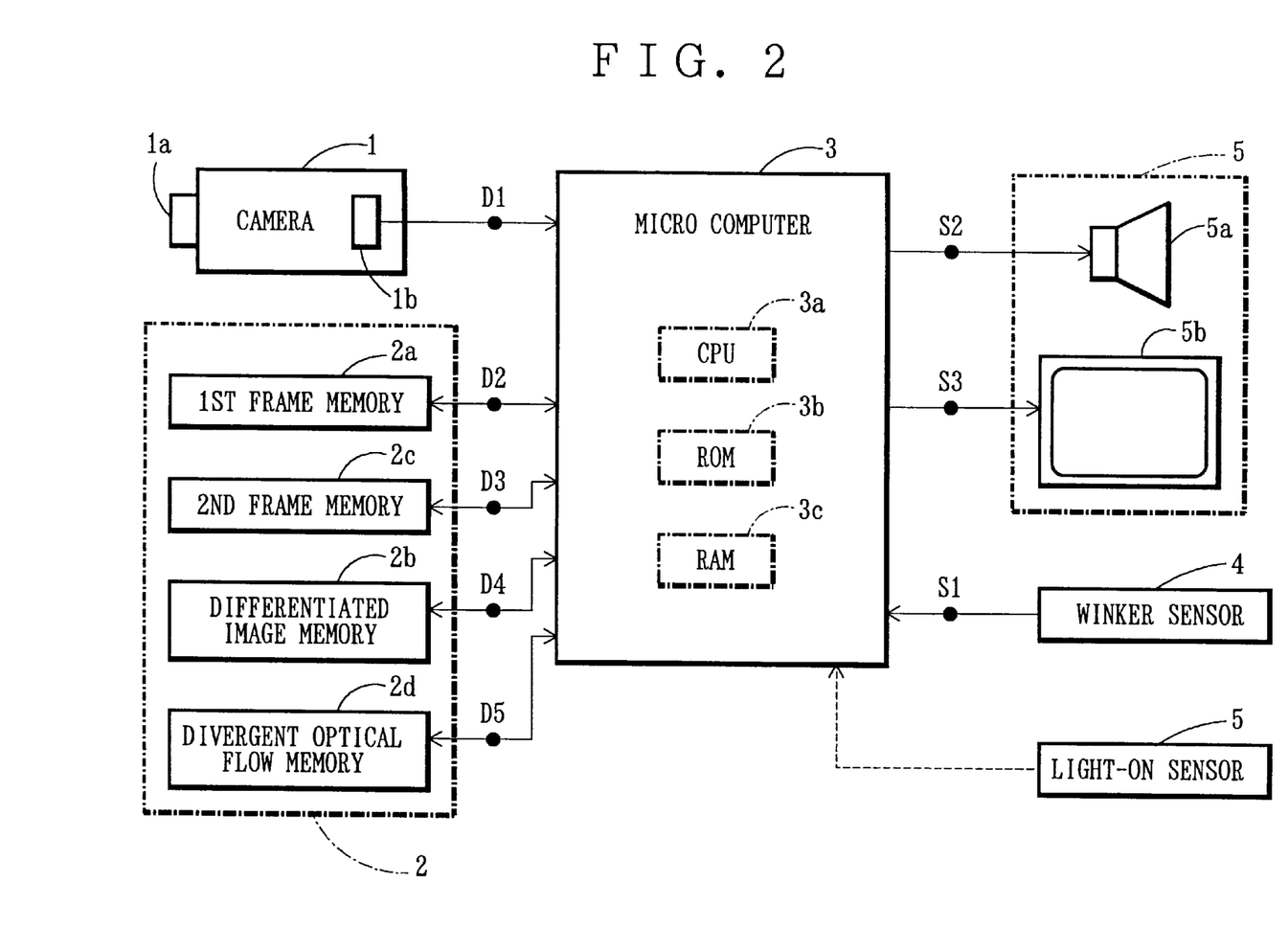
FIG. 2 is a block diagram of an embodiment of the environment monitoring system according to the present invention.
Figure 3:
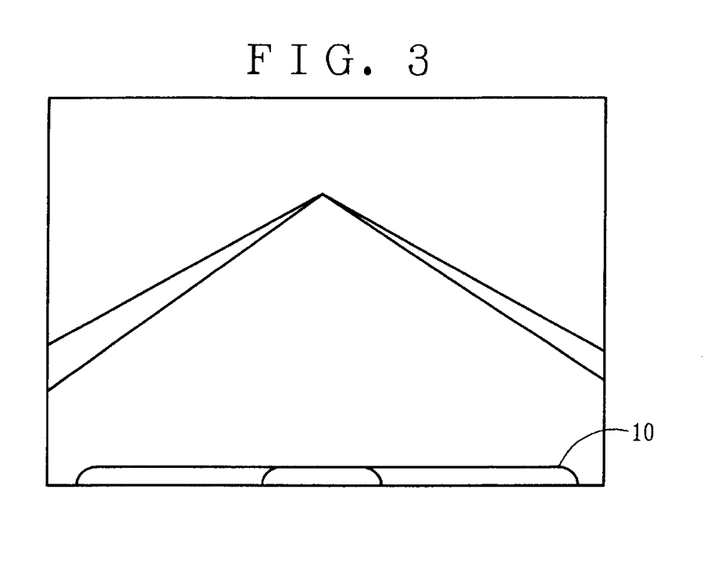
FIG. 3 is a view for explaining the location of a camera.

FIG. 2 is a block diagram of an embodiment of the environment monitoring system according to the present invention. As shown in FIG. 2, a camera 1 loaded on a vehicle, which serves as an image pick-up means, focuses an image over an angle of view defined by a lens 1a on an image plane 1b. As shown in FIG. 3, the camera 1 is installed so that it can pick up a bumper 10 at a prescribed position in the image.

A storage section 2 includes a first frame memory 2a, a second frame memory 2b, a differentiated frame memory 2c and a divergent optical flow memory 2d. The first and the second frame memory 2a and 2b temporarily store, as D2 and D3, the pixels in a m- by n-matrix (e.g. 512×512 pixels and with the luminance in 0–255 tones) converted from the image data D1 imaged on the image plane 1b of the camera 1, and supplies them to a microcomputer 3.

The first frame memory 2a and second frame memory 2b successively store the m×n pixel data D2 and D3 converted from the image picked up at an established period Δt in such a manner that it is stored in the first frame memory 2a at timing t, in the second frame memory 2b at timing t+Δt, ..

The differentiated image memory 2c stores the differentiated image data D4 created by differentiating the pixel data D2 and D3. The divergent optical flow memory 2d stores optical flow data D5 in a divergent direction and supplies them to the microcomputer 3.

The microcomputer 3 is connected to a winker detection switch sensor 4. The winker detection switch, which is attached to a winker mechanism of a vehicle, produces a winker signal S1 at "H" level when a winker (turn signal) switch turns on. The winker switch is turned on by a driver when he turns around the vehicle toward the right or left side.

Figure 4A:
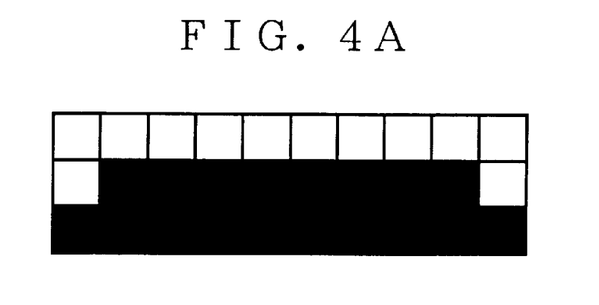
FIGS. 4A and 4B are views for explaining a first and a second image data, respectively.

The microcomputer 3 includes a CPU 3a which operates in accordance with a control program, an ROM 3b for storing the control program for the CPU 3a and prescribed values, and RAM 3c for temporarily storing data necessary to perform computation of the CPU 3a. The ROM 3b, which serves as an image storage means, stores first image data of the bumper 10, as shown in FIG. 4A, which should be picked up by the camera 1 when the approaching vehicle can be detected using optical flows.

The CPU 3a, which serves as a decision means, computes similarity between the second image data of the bumper 10 and the first image data stored in the ROM 3b at any optional timing when it is cut out from the pixel data D2 stored in the first frame memory 2a. If the similarity is lower than a prescribed value, the CPU 3a decides that the approaching vehicle cannot be detected using the optical flows, and supplies an audio signal S2 and image signal S3 to a warning generating section 5 which serves as a warning generating means. If the similarity is not lower than the prescribed value, the CPU 3a decides that the approaching vehicle can be detected using the optical flows. In this case, the CPU 3a operates as an optical flow detecting means to detect the optical flows and subsequently operates as a danger deciding means to decide the danger degree of collision with the approaching vehicle on the basis of the magnitude of the optical flows.

The warning generating section 5 has a speaker 5a and display 5b. On the basis of the sound signal S2 produced from the microcomputer 3 where it is decided that there is danger of collision or contact with another vehicle, and that the approaching vehicle cannot be detected using the optical flows, the speaker 5a indicates warning by a sound, i.e. generates audio guidance or warning on each of these facts.

Through the above operation of the speaker, a driver can notice the above fact, and drive his own vehicle with safety in this case.

The display 5b displays the image picked up by the camera 1. In addition, on the basis of the image signal S3 produced from the microcomputer 3 where it is decided that there is danger of collision or contact with the other vehicle which has approached one's own vehicle, and the approaching vehicle cannot be detected using the optical flows, the display 5b visually indicates the danger for the driver by displaying the pertinent message. The display 5a may be a display used for a television receiver.

An explanation will be given of the operation of an environment monitoring system having the configuration described above. First, the pixel data D2 stored in the first frame memory 2a is captured. The pixel region corresponding to the bumper 10 is cut out from the captured data D2 to acquire the second image data. The luminance of the second image data is compared with that of the first image data of the bumper 10 when the approaching vehicle can be detected using the optical flows, as shown in FIG. 4A, thereby computing the similarity between the first image data and the second image data.

Figure 4B:
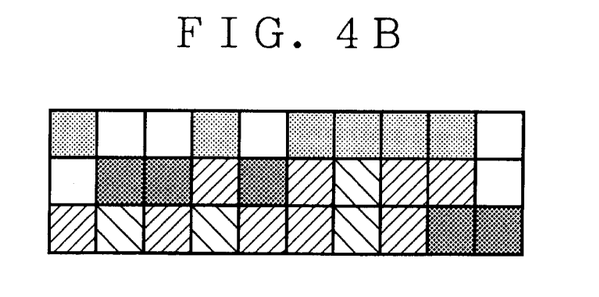

As a result of computation of the similarity, if the similarity is lower than the prescribed value (which occurs, for example when the luminance of the entire image is constant because fog has been generated as shown in FIG. 4B), the first image can be acquired as prescribed information. Then, it is decided that the approaching vehicle cannot be detected using the optical flows. In this case, the CPU 3a serves as an image processing stopping means so that it does not detect the optical flows. In this way, since the detection of the optical flows is not executed when the approaching vehicle cannot be detected, a driver is not misled by the incorrect detection of the approaching vehicle, thereby improving the safety of vehicle running.

In order to alert the driver, the speaker 5a is caused to make audio guidance that the approaching vehicle cannot be detected, and the display 5b is caused to display that "the approaching vehicle cannot be detected". If the similarity is higher than the prescribed value, the first image data can be acquired as the prescribed data from the image picked up by the camera 1. In this case, on the basis of the decision that the approaching vehicle can be detected using the optical flows, the optical flows are detected to detect and the approaching vehicle.

As described above, since the pixel region for only the second image data of the image picked up by the camera 1 is image-processed to compute the similarity between the second image data and the first image data, the image processing for deciding whether or not the approaching vehicle can be detected can be reduced.

Figure 5:
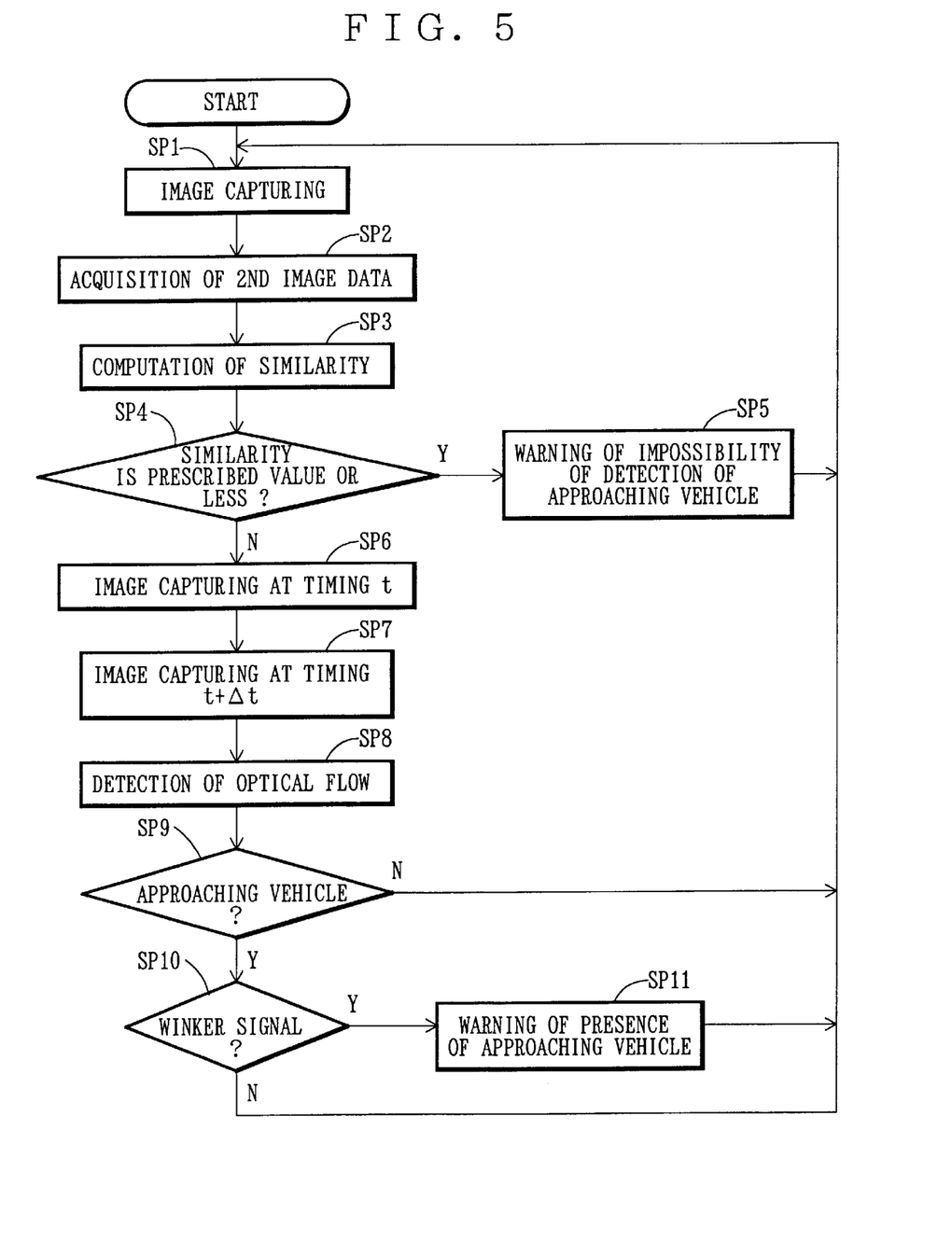
FIG. 5 is a flowchart showing the processing procedure of CPU 3a in a first concrete example.

Referring to the flowchart of FIG. 5 showing the processing procedure of the CPU 3a, an explanation will be given of the detail of the operation of the environment monitoring system as described hitherto.

First, the image data D1 picked up by the camera 1 is captured (step SP1). The captured data D1 is converted into the pixel data D2. The pixel region corresponding to the bumper 10 is cut out from the captured data D2 to acquire the second image data (step SP2). The luminance of the second image data is compared with that of the first image data of the bumper 10 when another approaching vehicle can be detected using the optical flows, thereby computing the similarity between the first image data and the second image data (step SP3). As a result of computation of the similarity, if the similarity is lower than the prescribed value ("N" in step SP4), it is decided that the approaching vehicle cannot be detected using the optical flows. The warning for noticing this fact is generated from the speaker 5a and display 5b (step SP5).

If the similarity is higher than the prescribed value ("Y" in step SP4), it is decided that the approaching vehicle can be detected using the optical flows, and the image data D1 picked up at timing t is captured. The captured image data D1 is held in the first frame memory 2a (step SP6). Next, the image data D1 picked up at timing t+Δt is captured and held as pixel data D3 in the second frame memory 2b. The optical flows diverging from the FOE (Focus of Expansion) are detected and stored in the diverging optical flow memory 2d (step SP8).

If the length of the optical flows stored in the divergent optical flow memory 2d is longer than a prescribed value, it is decided that there is the approaching vehicle ("Y" in step SP9). If a winker signal S1 has been produced from the winker detecting sensor ("Y" in step SP10), on the basis of the decision that lane changing is dangerous, the speaker 5a and display 5b are caused to generate a warning (step SP11). If the length of the optical flows is shorter than the prescribed length ("N" in step SP9), or it can be decided that the driver does not have no intention of changing his own lane because no winker signal S1 has been produced ("N" in step SP10), the processing is returned to step SP1.

In the first embodiment, although the bumper was used as a reference object, it may be any object such as a ball attached to the bumper as long as it can be located within a range where it can be picked up by the camera 1.

Embodiment 2

In the first embodiment, the first image was used as the prescribed information. However, different items of prescribed information may be adopted according to whether or not a light-on signal S5 has been produced (Incidentally, the light-on signal S5 is produced from a light-on detecting sensor (light-on detecting means) 6 when a light-on switch for turning on/off a head light turns on). For example, while the light-on signal S5 is not produced, the prescribed information may be the normality detecting degree of the white line which is detected from the image picked up by the camera when the approaching vehicle can be detected. While the light-on signal S5 is produced, the prescribed information may be the normal image from the light of the other vehicle running in the environment, which is picked up by the camera 1 when the approaching vehicle can be detected.

By using, as the prescribed information, the normal detecting degree of the white line which can be detected over the entire image, it is not decided that the prescribed information has not been obtained even when the environment cannot be partially picked up by the camera 1 because of stain applied to the camera 1. Therefore, it can be detected whether or not the prescribed information has been acquired from the image picked up by the camera 1.

In the nighttime while the headlight is "ON", the normal image from the light is used as the prescribed information, and in the daytime while the headlight is "OFF", the normal detection degree of the white line is used as the prescribed information. Therefore, in both daytime and nighttime, it can be detected whether or not the approaching vehicle can be detected.

Figure 6:
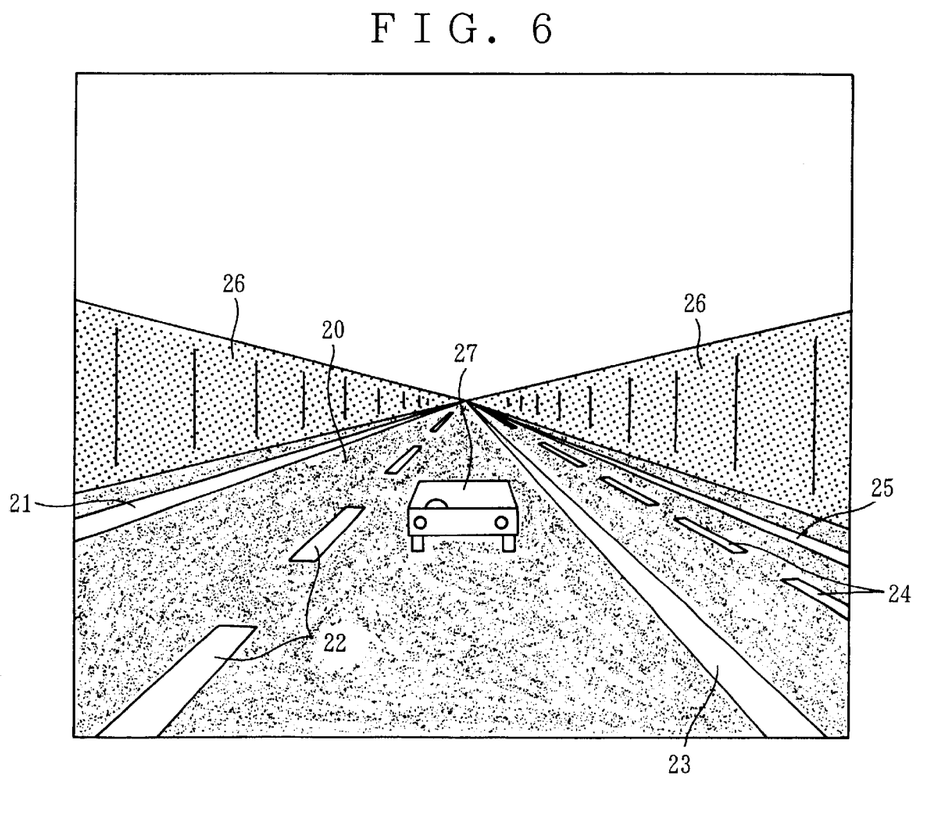
FIG. 6 is a view showing the image picked up by a camera.

An explanation will be given of the operation of the environment monitoring system according to the second embodiment. In the daytime, when the light-on signal S5 is not produced from the light-on detecting sensor 6, the camera supplies the image as shown in FIG. 6 as the image data D1 to the microcomputer 3. The image picked up by the camera includes a road 20, white lines 21–25 pained on the road 20, and side walls provided uprightly on both sides of the road which disappear at the center position in a horizontal line on an image screen. The image data D1 are stored as the pixel data D2 and D3 in the first frame memory 2a and the second frame memory 2b at prescribed intervals Δt.

Figure 7:
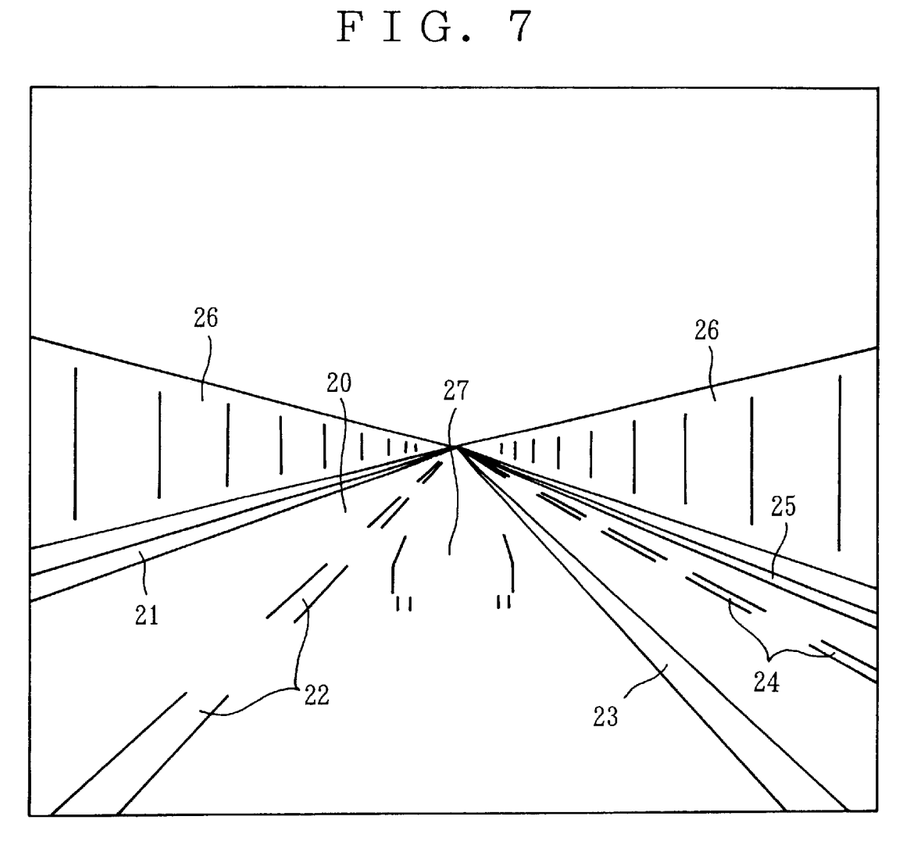
FIG. 7 is a view showing the differentiated image (or edge image) created by differentiation of the picked-up image.

Through the processing by the CPU 3a, the pixel data D2 having the luminance of I m,n at the pixel at m-th row and n-th column are scanned horizontally in FIG. 6 so that a different in luminance (Im,n+1-Im,n) between the pertinent pixel and an adjacent pixel is acquired. If it is larger than a prescribed value, luminance Imn=1 is taken. If it is smaller than the prescribed value, luminance Imn=0 is taken. On such an assumption, a differentiated image (edge image) as shown in FIG. 7 which represents the image at only the edges of the picked-up image is created. The differentiated image thus created is supplied as differentiated image data D4 to a differentiated image memory 2c.

Figure 8:
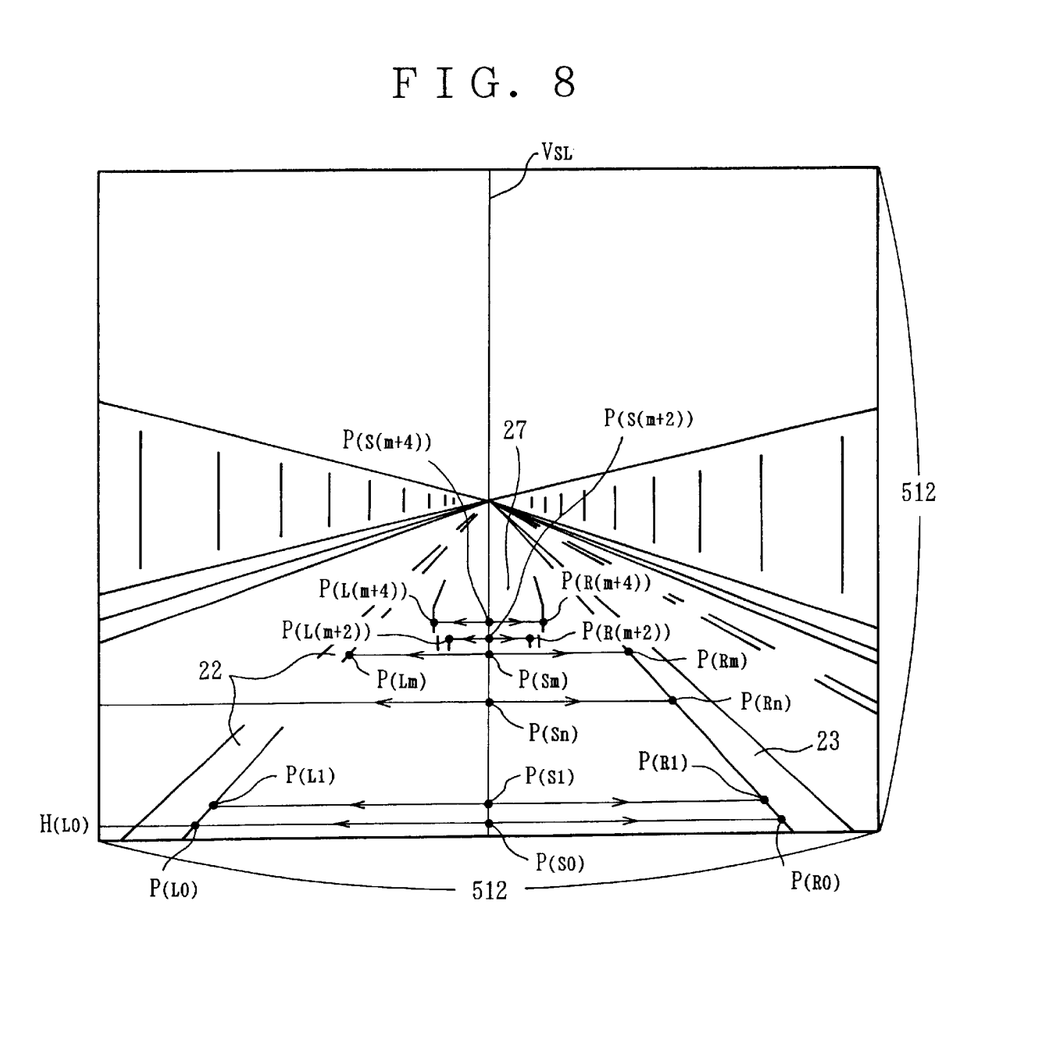
FIG. 8 is a view for explaining the operation of detection of white lines.

A reference line $V_{SL}$ as shown in FIG. 8 is set for the differentiated image. The reference line $V_{SL}$ is set to run vertically on the differentiated image at a center position in the horizontal direction of the differentiated image. Namely, the reference line is set at a center in the horizontal direction of the lane on which one's own vehicle runs and sectioned by the white lines 22 and 23.

After the reference line $V_{SL}$ has been set, searching is carried out of the edge points of a pair of white lines 22 and 23 which are located on both sides of one's own lane. Searching the edge points of the white lines 22 and 23 is carried out upward from a horizontal line $H_{(LO)}$ located at the bottom of the screen shown in FIG. 8. The edge points are searched from the lowermost end on the reference line $V_{SL}$ toward both ends in the horizontal direction. Thus, the edge points $P_{(LO)}$ of the white line 22 and $P_{(RO)}$ of the white line 23 are acquired which are located on the left and right side of the reference line $V_{SL}$, respectively.

Next, the edge points are searched from the point $P_{S1}$, which is located at the second point from the lowermost end, toward both ends in the horizontal direction. Thus, the edge points $P_{(L1)}$ of the white line 22 and $P_{(R1)}$ of the white line 23 are acquired which are located on the left and right side of the reference line $V_{SL}$, respectively.

Such processing will be carried out successively upward to acquire the edge points on the differentiated image. In this case, the edge points $P_{(L(m+2))}$, $P_{(R(m+2))}$, $P_{(L(m+2))}$, $P_{(R(m+2))}$ of the following vehicle will be taken so that only the edge points on the same line are further extracted. As a result, only the edge points of the pair of white lines on both sides on the lane on which one's own vehicle runs. Accordingly, the CPU 3a can operate as the white line detecting means.

Where the entire screen is blurred or whitish because of fog or strong rain, there is no substantial difference in luminance between the adjacent pixels so that it is difficult to extract edge points. In this case, the CPU 3a serves as a detection degree computing means. Namely, the CPU 3a counts what number of times (detection degree) the state where the number of edge points of the white line is smaller than a prescribed value continues. If the counted value exceeds a prescribed number of times, on the assumption that the normal detection degree as the prescribed information has not been satisfied, it is decided that the approaching vehicle cannot be detected, and warning is issued from the warning generating section.

If the number of the edge points of the white line is larger than the prescribed value or the state where the number of edge points of the white line is smaller than a prescribed value does not continue by the prescribed number of times, on the assumption that the normal detection degree as the prescribed information has been satisfied, approximated lines are created from the extracted edge points through the minimum square law, and detected as the white lines 22 and 23. The approximated lines are extended to set the crossing point as the FOE.

Likewise, with respect to the pixel data D3 of the image picked up after Δt, the pair of white lines 22 and 23 are detected which are located on both sides of one's own lane. The crossing point of the extended white lines 22 and 23 is set as FOE. The optical flows radially diverging from the FOE are detected to detect the approaching vehicle.

The CPU 3a operates as a light image detecting means in the nighttime while the light-on signal S4 is produced. Namely, it extracts the pixels having the luminance larger than a prescribed value from pixel data D2 picked up by the camera 1 at any timing to detect any image from the light of another vehicle running in the environment of one's own vehicle. If the optional image thus detected is an image which is not acquired when the approaching vehicle can be detected (e.g. the detected image is larger because of rain than the normal image when the approaching image can be detected, or distorted because of fog), on the assumption that the approaching vehicle cannot be detected, warning is issued from the warning section 5.

Figure 9:
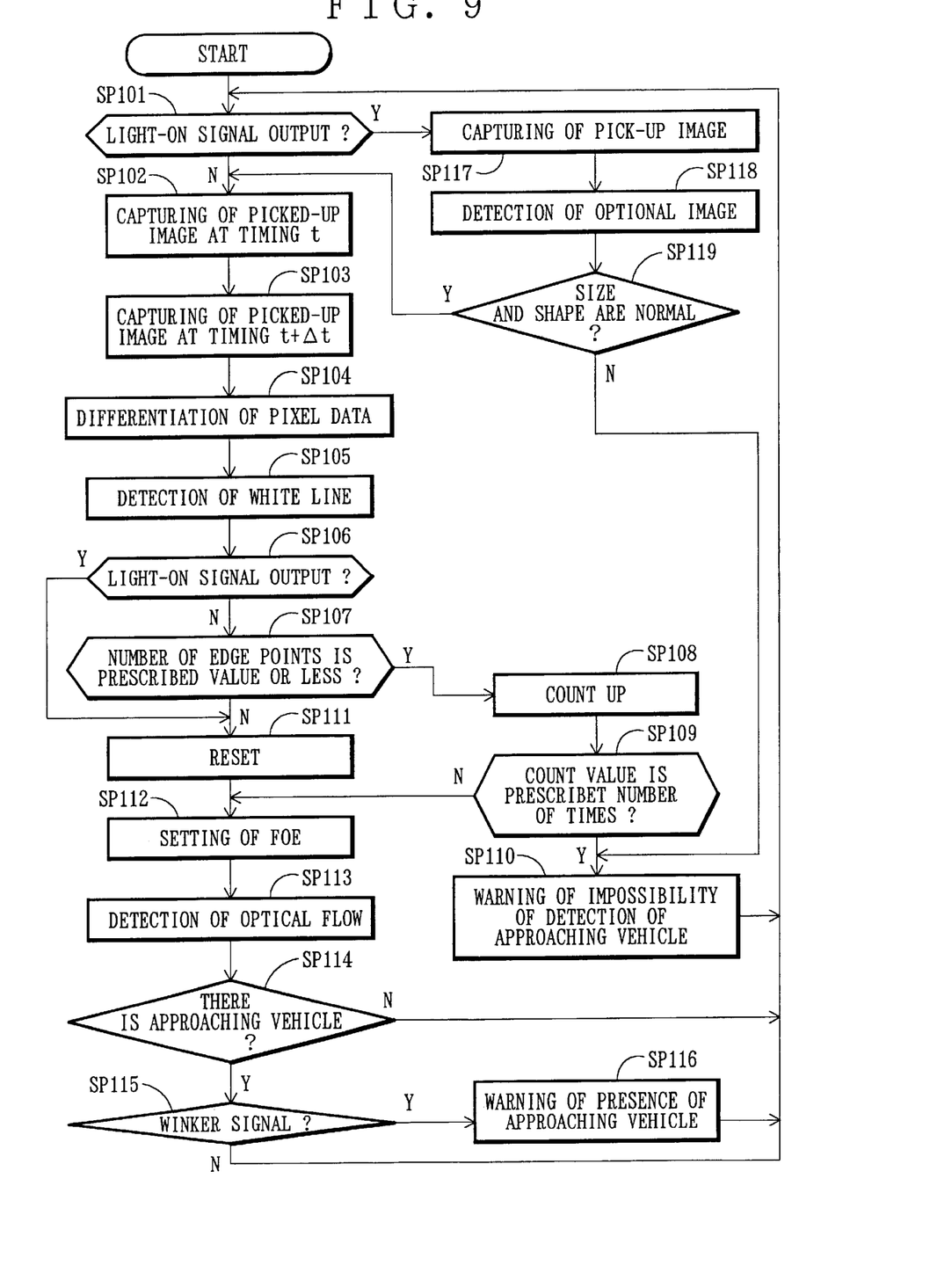
FIG. 9 is a flowchart showing the processing procedure of CPU 3a in a second concrete example of the environment monitoring system according to the present invention.

Referring to the flowchart of FIG. 9 which shows the processing procedure of the CPU 3a, an explanation will be given of the operation according to this embodiment.

When the light-on signal S4 is not produced ("N" in step SP101), the image data D1 picked up at timing t as shown in FIG. 6 is captured from the camera 1. It is stored as the pixel data D2 in the first frame memory 2a (step SP102). The image data D1 picked up at timing t+Δt is captured and stored as the pixel data D3 in the second frame memory 2b (step SP103).

These pixel data D2 and D3 are differentiated to extract the edge points so that the differentiated image as shown in FIG. 7 is created (step SP104). By extracting the edge points constituting the white lines on both sides of one's own lane, the white lines are detected (step SP105). At this time, if the light-on signal S4 has not been issued from the light-on detecting sensor 6 ("N" in step SP106), whether or not the number of edge points is smaller than a prescribed value is decided. If so ("Y" in step SP107), the count value of the counter in the RAM 3c is counted up (step SP108). As a result of count-up, if the count value is larger than a prescribed number of times ("Y" in step SP109), on the assumption that the approaching vehicle cannot be detected using optical flows, the warning is indicated by means of the speaker 5a and display 5b. The processing is returned to step SP101.

If the number of the extracted edge points is larger that the prescribed value ("N" in step SP107), the counter is reset (step SP111). The crossing point of the extended lines of the detected white lines is set as the FOE (step SP112). In order to detect the danger for another vehicle running on the adjacent lane or following one's own vehicle, the optical flows are detected (step SP113). When the optical flows are oriented in a direction diverging from the FOE, and have a length exceeding a prescribed length, it is decided that another vehicle is approaching one's own vehicle ("Y" in step SP114). The state of the winker detecting sensor 4 is captured (step SP115). If the winker signal S1 has been produced ("Y" in step SP115), the warning is indicated by means of the speaker 5a and display 5b (step 116). Thereafter, the processing is returned to step SP101.

If there is no approaching vehicle (i.e. the optical flows are in a direction of converging into the FOE or a length not exceeding the prescribed length in the diverging direction) ("N" in step SP114), or the winker signal S1 has not been issued (the driver has no intention of lane changing), on the assumption that the danger degree is low, the processing is returned to step SP101.

If the head light signal S4 has been produced ("Y" in step SP101), on the assumption that it is in the nighttime, the image data D1 is captured from the camera 1 (step SP117), and converted into the pixel data D2. The pixels having the luminance exceeding the prescribed value in the pixel data D2 are detected as an optional image from the light of the vehicle running in the environment (step SP118). If the optional image is an image which is not obtained when the approaching vehicle can be detected ("Y" in step SP119), the processing proceeds to step SP110. If the optional image is the normal image obtained when the approaching vehicle can be detected ("Y" in step SP119), the processing proceeds to step SP102.

In accordance with the second embodiment, it can be decided whether or not the approaching vehicle can be detected using the optical flows, thereby reducing the production cost of the system.

In the second embodiment, the number of times the state where the number of edge points of the white line is smaller than a prescribed value continues is counted as the optional detection degree. However, the total number of edges of the white line when it is detected at a prescribed number of times may be detected as the optional detection degree. In this case, if the total number of edges is smaller than a prescribed value, it is decided that the approaching vehicle can be detected. Further, the number of times the state where the white line cannot be detected continues may be counted as the optional detection degree. In this case, if the count value is larger than the prescribed value, it is decided that the approaching vehicle cannot be detected.

By deciding whether or not the prescribed information can be acquired as in the first and the second embodiment, it can be decided directly from the image picked up by the camera whether or not the approaching vehicle can be detected. Thus, it can be properly decided that the approaching vehicle cannot be detected.

In the first and the second embodiment, the approaching vehicle is detected using the optical flows, thereby deciding the danger degree. However, the position P of the approaching vehicle is computed using two cameras, the danger degree can be decided on the computed position. In this case, even if the one of them can detect another approaching vehicle, if the other camera thereof cannot detect it because of stain, the approaching vehicle cannot be resultantly detected. Therefore, it must be decided whether or not the prescribed information can be acquired from the images picked up by two cameras, respectively.

Embodiment 3

A wiper signal may be used in order to decide that the optical flows cannot be detected. Specifically, in the same configuration as in the first embodiment, a wiper sensor is connected to the microcomputer 3. The wiper sensor is served as a wiper usage detecting means which produces a wiper signal S5 at H level when a wiper switch is turned on. In operation, when the driver has used a wiper because of rain or snow, the wiper signal is produced from the wiper sensor. At this time, it is decided that the optical flows cannot be detected. In this case, since it can be decided indirectly without performing image processing whether or not the approaching vehicle can be detected, the production cost for the monitoring system can be reduced.

What is claimed is:

1. An environment monitoring system for a vehicle comprising:

image-pickup means loaded on the vehicle for picking up an environment of the vehicle to acquire an image;

image-processing means for processing the image to detect an approaching vehicle;

danger deciding means for deciding danger for said approaching vehicle;

means for deciding whether or not the approaching vehicle can be detected by said image processing means with a help of prescribed information when the approaching vehicle can be detected; and warning means for giving warning when it is decided that said approaching vehicle cannot be detected by said image processing means;

wherein said prescribed information is a first image of an object at a prescribed position in the image picked up by said pick-up means when the approaching vehicle can be detected by said image processing means.

2. An environment monitoring system according to claim 1, wherein said decision means decides "NO" if prescribed information is not acquired at any timing from the image picked up by said image pick-up means.

3. An environment monitoring system according to claim 2, wherein said prescribed information is a first image of an object at a prescribed position in the image picked up by said pick-up means when the approaching vehicle can be detected by means of said image processing means; and said deciding means has an image storing means for storing said first image, said deciding means decides "NO" if similarity between said first image stored in said image storing means and a second image of the object at the prescribed position in the image picked up at any timing by said image pick-up means is lower than a prescribed value.

4. An environment monitoring system according to claim 2, wherein said image processing means further comprises: a white line detecting means for detecting a white line from the image picked up at any timing by said image pick-up means, said prescribed information is a normal detection degree of a white line to be acquired from the image picked up by said pick-up means when the approaching vehicle can be detected by means of said image processing means; and said deciding means comprises includes means for computing an optional detection degree of the white line detected by said white line detecting means, and decides "NO" when said optional detecting degree does not satisfy the normal detection degree.

5. An environment monitoring system according to claim 4, further comprising a light-on detecting means for detecting turn-on of a light of the vehicle running in the environment, wherein said prescribed information includes said normal detection degree of the white line and a normal image from the light of the vehicle running in the environment in the image picked up by said pick-up means when the approaching vehicle can be detected by means of said image processing means;

said deciding means includes light image detecting means for detecting an optional image from the light of the vehicle running in the environment in the image picked up by said pick-up means at any timing; and when the light-on detecting means detects "ON" of the light, said deciding means decides "NO" if the optional image is an image not obtained when the approaching vehicle can be detected by means of said image processing means, and when the light-on detecting means does not detect "ON" of the light, it decides the normal detection degree of the white line as said prescribed information.

6. An environment monitoring system according to claim 1, wherein said deciding means includes a wiper usage detecting means whether or not a wiper is used, and decides "NO" when the wiper usage detecting means detects that the wiper is used.

7. An environment monitoring system according to claim 2, wherein said image processing means includes an optical flow detecting means for detecting, as an optical flow, movement of the corresponding points in two images obtained at two timings by said image pick-up means; and said danger deciding means decides danger by detecting the vehicle approaching one's own vehicle on the basis of magnitude of the optical flow detected by said optical flow detecting means.

8. An environment monitoring system according to claim 4, wherein said image processing means comprises:

said white line detecting means for detecting a pair of white lines located on both sides of one's own lane on which one's own vehicle should run;

optical flow detecting means for setting a crossing point of extended lines of said pair of white lines as an FOE (focus of expansion) and detecting, as an optical flow, movement of the corresponding points in two images obtained at two timings by said image pick-up means; and said danger deciding means decides danger by detecting the vehicle approaching one's own vehicle on the basis of magnitude of the optical flow detected by said optical flow detecting means.

9. An environment monitoring system according to claim 1, further comprising image processing stopping means for stopping said image processing means from detecting the approaching vehicle when said decide means decides that the approaching vehicle cannot be detected by said image processing means.

10. An environment monitoring system for a vehicle comprising:

image-pickup means loaded on the vehicle for picking up an environment of the vehicle to acquire an image;

image-processing means for processing the image to detect an approaching vehicle;

danger deciding means for deciding danger for said approaching vehicle;

means for deciding whether or not the approaching vehicle can be detected by means of said image processing means with a help of prescribed information when the approaching vehicle can be detected; and warning means for giving warning when it is decided that said approaching vehicle cannot be detected by means of said image processing means;

wherein said deciding means includes a wiper usage detecting means whether or not a wiper is used, and decides "NO" when the wiper usage detecting means detects that the wiper is used.

* * * * *